United States Patent [19]

Stevenson

[11] 4,023,043
[45] May 10, 1977

[54] COMPUTERIZED PEAK-SHAVING SYSTEM FOR ALLEVIATING ELECTRIC UTILITY PEAK LOADS

[75] Inventor: Robert H. Stevenson, Barrington, R.I.

[73] Assignee: Megatherm Corporation, East Providence, R.I.

[22] Filed: May 15, 1975

[21] Appl. No.: 577,936

Related U.S. Application Data

[62] Division of Ser. No. 497,967, Aug. 16, 1974, Pat. No. 3,906,242.

[52] U.S. Cl. .............................. 307/38; 235/151.21; 219/485
[51] Int. Cl.² ......................................... H02J 4/00
[58] Field of Search ................. 307/40, 35, 38, 39, 307/62, 140; 219/485; 340/310 A; 235/151.21

[56] References Cited

UNITED STATES PATENTS

| | | | |
|---|---|---|---|
| 2,641,716 | 6/1953 | Hyer et al. | 307/35 |
| 3,291,998 | 12/1966 | Wildi | 307/62 X |
| 3,359,551 | 12/1967 | Dennison | 235/151.21 X |
| 3,422,248 | 1/1969 | Beaulieu | 219/475 X |
| 3,540,030 | 11/1970 | Hartz | 307/140 X |
| 3,862,430 | 1/1975 | Lenhart et al. | 307/35 |

OTHER PUBLICATIONS

"A New Way to Control a Utility's Load Factor," Business Week, Aug. 24, 1974, pp. 28E, 28H.
Senecal, "Remote Control of Residential Electric Heating Loads," IEEE Conference Paper, (date of publication unknown).

Primary Examiner—Robert K. Schaefer
Assistant Examiner—Morris Ginsburg
Attorney, Agent, or Firm—Francis J. Lidd

[57] ABSTRACT

A system for lowering electrical energy peak demand while minimizing service disruption allows instantaneous dropping of a plurality of interruptible thermal storage devices with predictable reserve capacity. At the time the loads are dropped, a central computer establishes a plurality of permissible off-times for corresponding mutually exclusive groups of loads in similar installations based on characteristic projected energy consumption profiles predicted from past statistical history for the groups. At the end of each off-time interval, a central transmitter transmits reconnect signals to which the devices in the corresponding group are responsive. The groups of units are thus reconnected sequentially avoiding the possibility of generating a secondary peak by indiscriminate, simultaneous reconnection. The reconnection sequence is determined according to changing priorities which take into account the customer's needs at the time of disconnection. The system provides electric utilities with a controllable equivalent peak load capacity in excess of the total connected load of all noncontrolled devices. Employing load limiters at individual locations permits use of established commercial and industrial rate structures in concert with increased economy in the use of power by way of programmed peak load reduction.

10 Claims, 4 Drawing Figures

COMPUTERIZED PEAK-SHAVING SYSTEM FOR ALLEVIATING ELECTRIC UTILITY PEAK LOADS

CROSS-REFERENCE TO RELATED APPLICATION

This application is a division of U.S. application Ser. No. 497,967, filed Aug. 16, 1974 by Robert H. Stevenson, now U.S. Pat. No. 3,906,242, issued Sept. 16, 1975.

BACKGROUND OF THE INVENTION

The invention relates generally to the field of load management for electrical utilities and is concerned primarily with controlling peak power demand.

The design capacity of electric utility generating and distribution equipment should be sized on the basis of coincidental load factors. The generating capacity of the utility must be greater than the maximum demand for electricity experienced during the year. Electrical demand, however, is unevenly distributed throughout the year; and to meet seasonal demands, the electric utilities are faced with building additional generating stations and distribution facilities to meet a peak demand encountered on only a few days caused by electric air conditioning on the hottest summer day or by heating on the coldest day of the year. The rest of the year much of this equipment stands idle or operates uneconomically at low load factors. Presently the nation's utilities have an average equipment utilization factor of 40 percent in a 24-hour period. Moreover, the available peak generating capacity is reduced by removal of equipment for maintenance procedures.

Unable to keep pace with the rapid growth of electrical peak power loads, power companies have found the total load at certain hours of particular days of the year running within 10 percent of maximum capacity, well beyond the safer margin of 20 percent which is normally required. Running this close to capacity is hazardous since failure of any generating or distribution equipment will result in a substantial overload, often with disastrous results such as brown outs or widespread interruption of service. In many instances utilities are forced to purchase power from neighboring utilities at great costs, because of the cost and substantial lead time required to build extra generating stations and transmission equipment which, due to coincidence peaks, would remain idle much of the time.

Attention is being devoted to schemes for trimming or "shaving" the demand peaks of the seasonal and monthly variety so that maximum generating capacity will be more in line with the average demand throughout the year to promote economical operation and safer operating margins on peak days. Disconnecting or "shedding" certain customer loads on a priority basis is one means of establishing reasonable capacity margins. All utilities may have various types of loads, some of which are what may be classified as controllable or interruptable loads, for example, electric hydronic heating, snow melting, warehouse heating and cooling, marginal lighting, etc. Unlike these seasonally varying loads, however, domestic hot water, for example, represents a controllable base load which is present 24 hours a day, 12 months a year, and may be interrupted without inconvenience to the customer.

Selective load dropping according to priority schedules is discussed in U.S. Pat. No. 3,359,551 to Dennison; Brinks, "Controlling High-Capacity Power Demand", *Electrical Construction and Maintenance*, January 1971, page 74; and Bailey, "Selective Energy Use - Proposing a New Dimension in Electric Power Control", *Control Engineering*, 1972. These references note that residential commercial or industrial loads may be turned off remotely, for example by radio signals transmitted from a central station in the event of a power shortage. U.S. Pat. Nos. 2,641,716 to Hyer et al and 3,540,030 to Hartz, and the Dennison patent, supra, specifically discuss shedding of conventional hot water heater loads with controlled reconnection according to fixed schedules.

While hot water heater loads used by customers for domestic water, process water or space heating may represent the best form of controllable nonessential electrical load for peakshaving, customer acceptance, reliable service and increased cost remain the most serious problems. Depending on the nature of the use, the time of day and the reserve capacity, some hot water heater loads are less likely to cause service interruption than others if removed from the line for a given period of time. The prior art systems failed in particular to distinguish on a rational day-to-day basis between these different classes of hot water heating loads and varying costs of power. In addition, sudden interruption of loads and subsequent uncontrolled reconnection may result in a rate penalty for the user. Indiscriminate reconnection of a number of controlled loads after a period of disconnection can also produce a secondary demand peak at the power company.

SUMMARY OF THE INVENTION

The general purpose of the invention is to provide a load shedding and reconnecting scheme which takes into account the differences in usage among a plurality of similar loads, in particular, hot water heaters, in order to maintain reliable service without increased electric rate charges while achieving an instantaneous reduction in peak demand and reducing the likelihood of creating a secondary peak by reconnection.

According to the present invention, electrical demand may be instantaneously reduced while minimizing the impact of service disruption, by remotely disconnecting a plurality of similar, interruptible energy storing loads (e.g., hot water heaters) and by subsequently reconnecting predetermined mutually exclusive groups of these loads, one-group-at-a-time, in accordance with stored data giving "permissible off-times" for the groups based on characteristic energy consumption profiles established by past statistical history for the load groups typed by similar reserve-capacity-versus-time-characteristics.

In a preferred embodiment the controlled loads are thermal storage water heaters of the type in which system water to be used by the customer is not heated directly as in conventional water heaters, but is heated by running the system water through heat exchanger coils immersed in a sealed reservoir of treated water heated by electrical coils. The design maximum temperature of the reservoir water may be several times as great as the desired temperature for the system water. Thus each thermal storage water heater has a very large reserve capacity compared to conventional water heaters. The reservoir heating unit can remain off the line for as much as half a day as the sealed water cools down. Removing a thermal storage unit from the line at an arbitrary time is much less likely to result in customer dissatisfaction than disconnecting a conventional water heater with its relatively small reserve capacity. Thermal storage water heaters thus offer greater potential as controllable loads. The invention thus takes advantage of the thermal storage water heater's natural ability to stay off the line for long periods. The invention in this regard presents a priority controller for returning to the electrical line those thermal storage units which are least able to endure prolonged disruption as of the time of disconnection. The total connected load of the thermal storage units is, due to coincidence peak conditions, equivalent to a far greater peak load of standard water heaters for the same installations. Thus, disconnecting all of the thermal storage units at once from the utility lines is equivalent, in relation to past practice, to removing a coincidence peak load of far greater dimensions. This is not to say, however, that the system is inapplicable to standard water heaters. The invention is adaptable to incorporate any type of load, like the standard water heater, which has statistically predictable reserve capacity.

In the preferred embodiment, each controlled load unit is equipped with extra reserve capacity and a load limiter which automatically cancels the order to reconnect where reconnection at a particular time would cause the customer's demand limit to be exceeded, and would thereby affect his monthly bill from the utility. This automatic cancellation will also serve to further reduce the probability of secondary peaks caused by reconnection. But, to power companies as well as customers, the primary advantage of using individual load limiters in conjunction with the peak-shaving system is that compatibility with established rate structures is preserved.

DESCRIPTION OF THE PREFERRED EMBODIMENT

Figure 1:
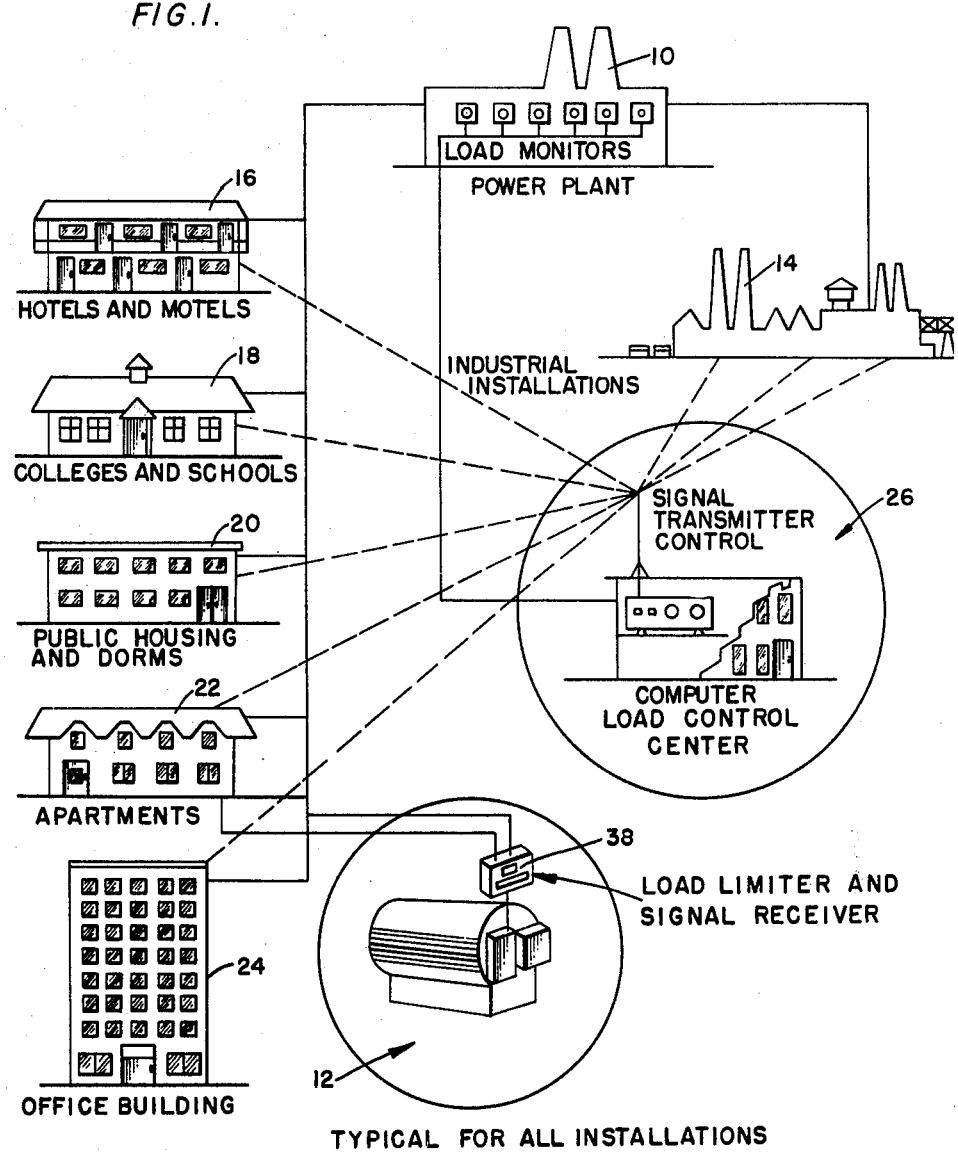
FIG. 1 is a pictorial representation of the system according to the invention.

FIG. 1 illustrates the overall relationship between the components of the peak-shaving system. A power plant 10 provides electricity to a distribution region in which a number of commercial and industrial users have been equipped with thermal storage hot water heater units 12. A suitable type of thermal unit 12 is shown in U.S. Pat. No. 3,422,248 to Beaulieu et al which illustrates practical apparatus embodying the thermal storage concept of water heating in which a large sealed reservoir of chemically treated water heated by electrical heating coils is employed to heat system water for the customer's use. The normally large temperature differential between the sealed tank water and the desired temperature of the system water creates large reserve capacity and enables the heating unit to be connected to the line only during the time when generating capacity is desired. Among all of the users of electricity in the distribution region, several different types of users who are equipped with thermal storage units 12 are selected for use in the peak-shaving system of the invention. For example, an industrial installation 14 is shown which could be using a thermal storage unit for process water as well as for domestic water or space heating and five commercial installations are illustrated: hotels and motels 16, colleges and schools 18, public housing and dormitories 20, apartments 22 and an office building 24. Each commercial installation is equipped with at least one thermal storage unit 12 which is used for domestic water or space heating or both. In the end, the total number and capacities of the units 12 selected for controlled operation in the peak-shaving system will of course be determined by the size of the equivalent peak load the power company desires to shed.

The principal component of the peak-shaving system is a computer load control center 26 located at the power plant 10 or at some other location in the distribution region. The load control center 26 is capable of selective radio communication with each unit 12 for performing control functions, described in detail below, when load monitors at the power plant 10 indicate an approaching demand peak. The system operates generally to instantaneously reduce the peak load at the power plant by dropping all or a predesignated portion of the radio-controlled hot water installations. The loads are reconnected according to predicted customer needs as of the time of disconnection.

Figure 2:
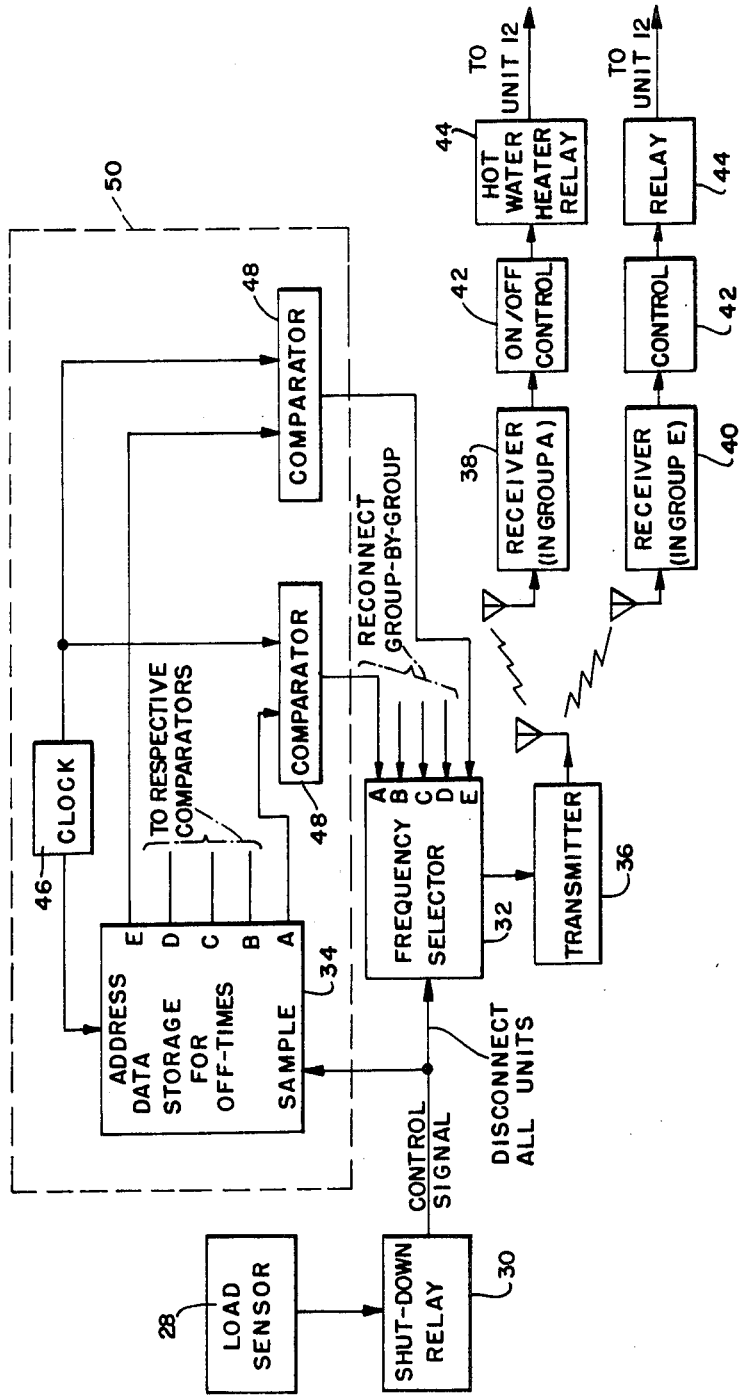
FIG. 2 is a block diagram of the system illustrated in FIG. 1.
Figure 3:
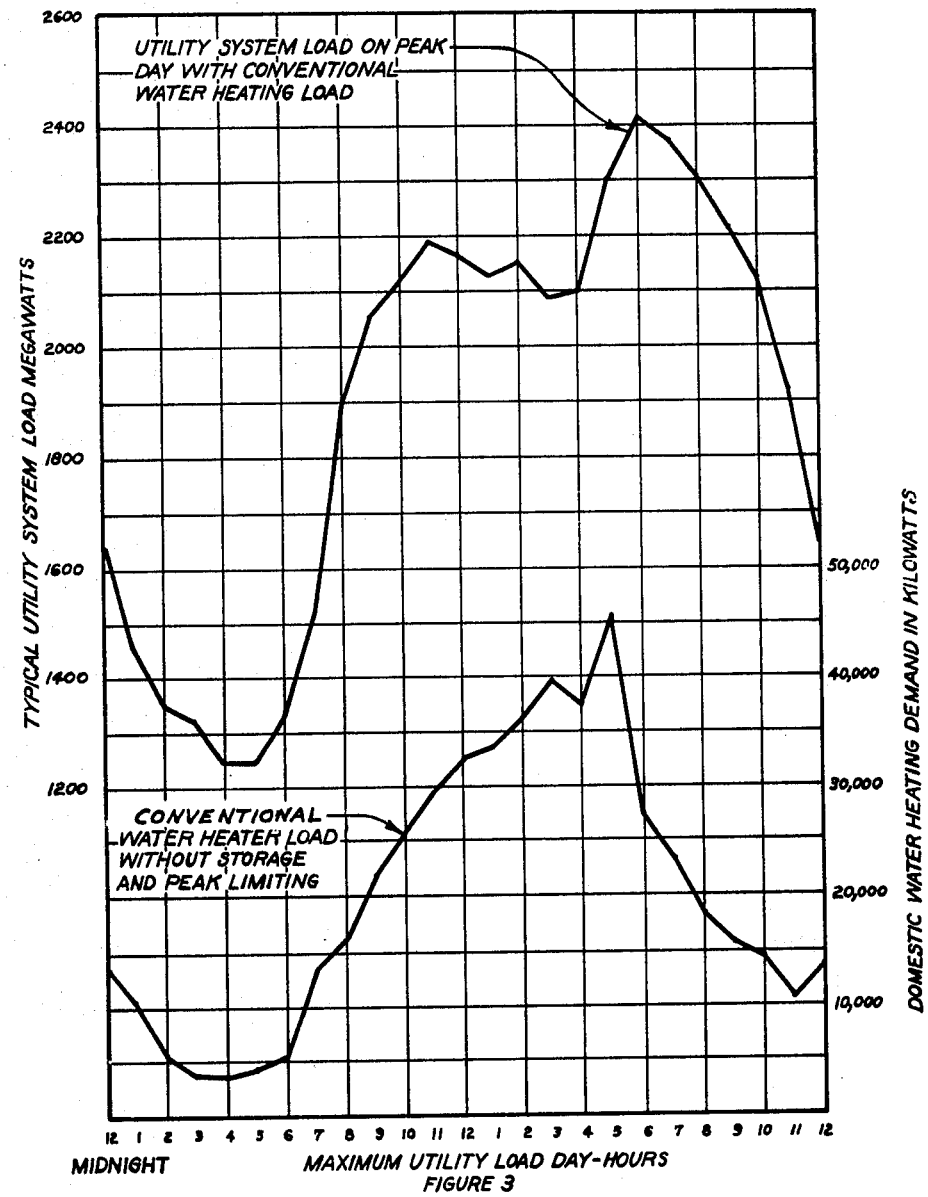
FIG. 3 is a compound graph indicating the total demand curve for an electric utility on a peak day, with load curves for equivalent standard and thermal storage water heaters.

As shown in FIG. 2, the system includes a load sensor 28 corresponding to the load monitors in the power plant 10 of FIG. 1. The varying utility load curve illustrated in FIG. 3 represents the parameter to which the load sensor 28 is responsive. When the utility load exceeds the economical generating level of the utility by a predetermined amount, the load sensor 28 issues a signal to a shut-down relay 30 at the computer load control center 26 (FIG. 1). If preferred, the signal to the relay 30 may be manually activated by utility personnel monitoring the load level. The output of the relay 30 is a control signal which is passed simultaneously to a frequency selector 32 and a memory or data storage unit 34.

The frequency selector 32 provides the input to a radio transmitter 36 which transmits tone codes or other signals to which radio receivers in the various groups of users shown in FIG. 1 are responsive. For convenience the user groups in FIG. 2 are designated by the letters A through E. Group A, for example, might consist of one or more apartment buildings each having a thermal storage hot water heating unit 12 operatively connected to a radio receiver 38 (FIG. 1 and 2) responsive to a corresponding frequency. Group E, for example, consists of another class of user equipped with thermal storage hot water heating units each associated with a respective receiver 40 responsive to a different frequency from receivers in the other groups. Suitable remote control receiver decoders are now commercially available. For example, the Motorola 800W system receiver decoder provides a single function switch designed to selectively remove and restore power to water heaters in response to corresponding transmitted tones. It should be noted that in FIG. 2 receivers 38 and 40 are for groups A and E respectively and other receivers responsive to corresponding different frequencies would be present for units 12 in the other groups B, C and D as well.

The control signal output of the shut-down relay 30 causes the frequency selector 32 to apply to the transmitter 36 for transmission a plurality of frequencies corresponding to all of the frequencies to which the groups A, B, C, D and E are responsive. The output of each receiver in each group causes a corresponding on/off control unit 42 to turn off the electricity to the corresponding thermal storage unit 12 (FIG. 1) if it is on, by means of a relay 44. Thus, in response to the output of the load sensor 28, all of the thermal storage units used in the peak-shaving system are taken off the line at a point in time designated herein at $t_1$.

The shut-down relay control signal also serves to access the data storage unit 34. The data storage unit may take the form of a read only memory which stores all of the permissible off-times for thermal storage units 12 in the groups A through E based on past usage statistics. The data storage unit 34 is organized into as many "channels" as there are groups of users, with each channel containing data indicative of permissible off-time, defined as the maximum period of time for which heating units in a given group may remain off the line, starting at a particular time, without interfering with customer demand. Because the permissible off-time for each group varies with the time of day, the data storage unit 34 is addressed by means of a clock 46. Thus when the storage unit 34 is "activated" or "enabled" by means of the control signal from the relay 30, the clock 46 applies the current time $t_1$ in digital form to the common address input of the storage unit 34. The multi-channel output corresponding to the usage groups A through E indicates the permissible off-time at time $t_1$ available for each group of units in similar installations. Each output channel from the storage unit 34 is applied to a corresponding comparator 48. Any intermediate storage capacity required to hold the channel output as the input to the comparator 48 after time $t_1$ is incorporated within the comparators or at the output stage of the storage unit 34. The complementary inputs to the comparators 48 are provided in common by the clock 46. Each comparator 48 provides an output only when the corresponding permissible off-time has elapsed as indicated by the output of the clock 46. If the permissible off-time for each group is not indicated in terms of clock time, that is, as 8 p.m. for example, but by design is indicated rather as an interval of time, for example two and one half hours, each comparator 48 would be equipped with a resettable counter operated by the clock 46 to register the time elapsed from the starting point $t_1$. The comparator would produce an output when the registered elapsed time matched the time interval established for the group by the storage unit 34.

The output of each comparator 48 is applied to a corresponding input of the frequency selector 32. An output signal from one of the comparators 48 causes a corresponding frequency to be selected and transmitted by the transmitter 36 so that each unit in the corresponding group is reconnected by means of the corresponding on/off control 42 and relay 44 at the expiration of its permissible off-time.

If desired, the components comprising the data storage unit 34, clock and comparators 48 may be provided in the form of a special purpose computer unit 50. Alternatively, those skilled in the art will recognize that the system may be implemented by means of a general purpose computer. The data storage unit 34 serves the function of a composite "look-up" table, and any conventional form of memory apparatus may be used to implement the required data retrieval. Instead of a memory unit, a calculator could be used in place of the data storage unit 34 if the permissible off-times for the various groups could be reduced to mathematical functions of time or if variables besides time alone mathematical functions of time or if variables besides time alone were desired to influence the permissible off-time for any of the groups. Nevertheless, the simplest form of the invention contemplates using stored data to indicate the time-varying intervals for which the heating equipment can remain off the line.

The data for each group can be provided in the form of a "listing" of permissible off-times corresponding to times of the day at half hour or hour intervals, or whatever intervals are desired. For example, the permissible off-time for a group of apartments each having thermal storage water heating units might be five hours at 6 a.m. (i.e., 6 a.m.) to 11 a.m.) and two hours at 5 p.m. (i.e., 5 p.m. to 7 p.m.). Thus, the permissible off-time for the same group depends on the time $t_1$ at which the load sensor 28 triggers the peak-shaving operation. Seasonal variations in permissible off-times can be accommodated by writing updated data into the storage unit 34 at particular times of the year, or as added experience dictates.

To prevent a thermal storage water heating unit from being reconnected to the line at a time of the day other than off-peak hours, when electrical rates are at a level which could affect the customers bill, a load limiter as indicated in FIG. 1 preferably will be associated with the signal receiving apparatus 38 for each unit 12 to postpone reconnection until lower rates come into effect at a later time. If a load limiter is used in this manner, additional reserve capacity might be required in the thermal storage heating unit 12 to meet customer demand during the maximum possible extended period of disconnection.

Figure 4:
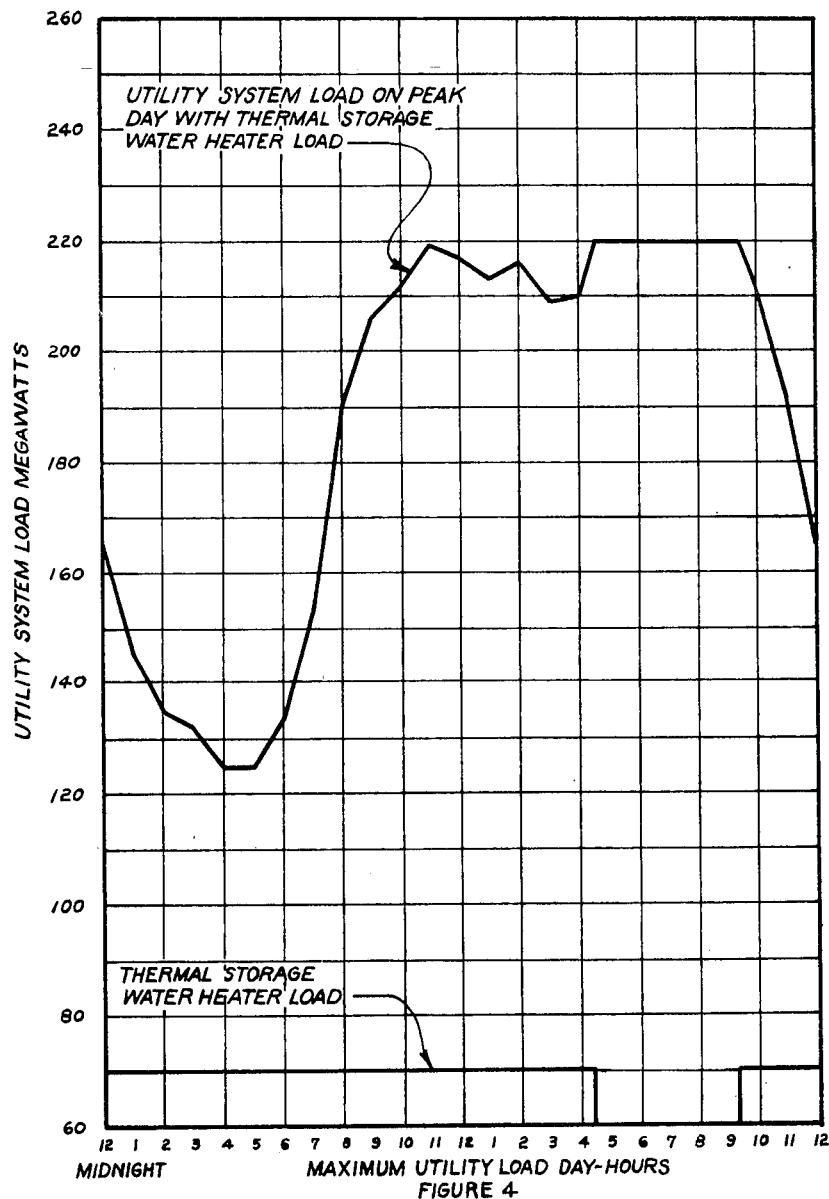
FIG. 4 is a compound graph of the same total utility demand and thermal storage water heater load parameters as in FIG. 3, showing the effect of the peak-shaving system, according to the invention.

The effect of removing a predetermined number of thermal storage units from the line at the same time causes the demand peak illustrated in FIG. 3 to be rapidly reduced to a lower level, as shown in FIG. 4, so that safe, efficient operating margins can be maintained without purchasing additional power from other sources. Because of the staggered return of the groups of hot water heating units to the line, a secondary peak will not be introduced by reconnection as in some prior art systems when standard water heaters were reconnected all at the same time.

In summary, the disclosed peak-shaving system provides instantaneous remote dropping of controllable, energy storage loads and a priority reconnection scheme which is specific to each customer load, time of day, calendar data and elapsed time from disconnect. In this way the major problem associated with load-shedding, i.e., maintaining reliable service, is overcome.

The savings to the utilities effected by the disclosed system can be measured in terms of the total load coincident with the demand peak (FIG. 3) which would have been presented had conventional water heating units been used in the peak-shaving system instead of those having thermal storage characteristics. Thus, even though the total connected load (maximum coincidence peak) of the thermal storage heating units might only be one megawatt, the "equivalent coincidence peak load" for standard water heaters could have been as much as three megawatts. Thus the utility is able to shed instantaneously the equivalent of a three megawatts coincidence peak load. The thermal storage water heating units serve the customers' demand as well as the standard water heaters did with their three megawatt coincidence peak load; and besides using less expensive energy in the normal operating mode with a load limiter, the thermal storage units are capable of being removed from the line with much less likelihood of interfering with customer service or charges for electricity.

While the preferred embodiment requires the use of thermal storage type water heating units, the basic concept of the invention is applicable to standard water heaters or similar loads because they too have a certain amount of reserve capacity. The problem, however, with conventional water heaters is that whenever they are taken off the line for a substantial period of time customer service deteriorates because the required temperature level can not be maintained. However, employing the means of this invention, some degree of load shedding, and hence reduction in the demand peak can be achieved within the bounds of customer acceptance. The use of thermal storage water heating units is not merely a difference in degree but a difference in kind because the reserve capacity of a thermal storage unit is capable of maintaining the same standard of service, i.e., the same temperature water supply to the customer, over long periods of time while disconnected from the line.

The invention also contemplates modification and improvements involving, for example, individual load calculations performed at the site of each water heater, conditioning of incoming signals and various other disconnect schemes located on site which in effect provide increased operating scope for a relatively simple supervisory signal from the computer load control center. Moreover, the control signal issued to remote installations can be transmitted by other means besides radio, for example, by telephone line or coded signals superimposed on the electrical distribution line by conventional techniques.

The invention may be embodied in other specific forms without departing from its spirit or principle. For example, the list of user groups indicated in FIG. 1 is by no means exhaustive and other groups such as nursing homes, having distinct usage characteristics are also intended to be embraced by the disclosed system. The present embodiments are therefore to be considered in all respects as illustrative and not restrictive, the scope of the invention being indicated by the claims rather than by the foregoing description, and all changes which come within the meaning and range of equivalence of the claims are therefore intended to be embraced therein.

I claim:

1. A method of lowering peak electrical energy demand on a central electrical distribution network to alleviate a power emergency while minimizing the impact of service disruption, comprising the steps of sensing the approach of an excessive demand peak, in response thereto remotely disconnecting simultaneously a plurality of similar interruptible loads powered via said network, and reconnecting predetermined mutually exclusive groups of said loads automatically, one-group-at-a-time, in accordance with stored permissible offtimes data for corresponding ones of said groups based on characteristic projected energy consumption profiles predicted from past statistical records for said groups, said groups being composed of loads having similar reserve-capacity-versus-time characteristics, whereby said loads are reconnected according to customer needs.

2. The method of claim 1, wherein said interruptible loads are energy storage loads.

3. The method of claim 1, wherein said loads are thermal storage loads.

4. The method of claim 1, wherein said loads are water heaters.

5. The method of claim 1, wherein said loads are thermal storage water heaters.

6. A system for lowering peak electrical energy demand on a central electrical distribution network to alleviate a power emergency while minimizing the impact of service disruption, comprising a plurality of similar interruptible loads powered via said network, a plurality of receiver control means associated respectively with said loads for disconnecting respective ones of said loads in response to corresponding signals and for reconnecting said loads after a predetermined delay, centralized transmitter means for generating said corresponding signals on command, first control means for causing said transmitter means to generate said signals such that said loads are simultaneously disconnected at one time from said network in response to a power emergency, data storage means for indicating a plurality of permissible off-times for corresponding mutually exclusive groups of said loads based on characteristic projected energy consumption profiles predicted from past statistical records for said groups, said groups being composed of loads having similar reserve-capacity-versus-time characteristics, and second control means operatively interconnected with said data storage means for causing said receiver control means to reconnect said loads one-group-at-a-time in accordance with the permissible off-times for said groups.

7. The system of claim 6, wherein said loads are energy storage loads.

8. The system of claim 6, wherein said loads are thermal storage loads.

9. The system of claim 6, wherein said loads are water heaters.

10. The system of claim 6, wherein said loads are thermal storage hot water heaters.

* * * * *